March 27, 1934.    E. B. NEWILL    1,952,181
APPARATUS FOR CORRUGATING AND WINDING METAL FOIL
Original Filed Aug. 13, 1931    2 Sheets-Sheet 1

INVENTOR
Edward B. Newill.
BY
Spencer, Hardman, and Fehr.
HIS ATTORNEYS.

March 27, 1934.  E. B. NEWILL  1,952,181
APPARATUS FOR CORRUGATING AND WINDING METAL FOIL
Original Filed Aug. 13, 1931  2 Sheets-Sheet 2

INVENTOR
Edward B. Newill.
BY
Spencer, Hardman, and Fehr.
HIS ATTORNEYS.

Patented Mar. 27, 1934

1,952,181

UNITED STATES PATENT OFFICE 1,952,181

APPARATUS FOR CORRUGATING AND WINDING METAL FOIL

Edward B. Newill, Dayton, Ohio, assignor to Frigidaire Corporation, Dayton, Ohio, a corporation of Delaware Application August 13, 1931, Serial No. 556,849
Renewed June 14, 1933

8 Claims. (Cl. 153—7)

This invention relates to refrigerating apparatus and more particularly to an apparatus for applying insulation on a cooling compartment to be assembled in a refrigerator cabinet.

Heretofore in insulating a compartment or compartments of refrigerator cabinets with a thin metal foil, having bright surfaces and spaced apart to provide air pockets therebetween, it was customary to wrap the foil by hand on or around the compartment or to apply the foil to the compartment in the form of individual sheets. Such methods of providing an insulating wall around compartments to be insulated are difficult to perform and also require much time and are therefore expensive methods.

The object of this invention is to provide improved apparatus for applying spaced or laminated metal foil insulation around the exterior surfaces of a compartment to be refrigerated without the necessity of manually handling or assembling the thin foil.

A further object of my invention is to cause relative movement between a compartment or equivalent member to be insulated whereby the foil may be wrapped in successive layers about the compartment, the foil having been automatically preformed to the desired shape or form before being applied to the compartment.

Further objects and advantages of the present invention will be apparent from the following description, reference being had to the accompanying drawings, wherein a preferred form of the present invention is clearly shown.

In the drawings:

Fig. 1 discloses an enlarged fragmentary sectional view of a portion of a compartment to be refrigerated having metal foil insulation placed therearound according to my invention;

Fig. 2 discloses a compartment to be insulated shown in section and associated with an apparatus for corrugating a metal foil preparatory to its being wound around the walls of the compartment;

Fig. 3 discloses a front view of the compartment and apparatus shown in Fig. 2, at the start of applying the foil around the walls of the compartment;

Specifically, I attain the objects heretofore enumerated by providing a source of foil supply, preferably in the form of a roll of foil and by providing means for conducting the continuous sheet of the foil from the source through a preforming device such as a corrugating apparatus to the compartment or equivalent member to be insulated. Relative movement of the compartment with respect to the corrugated sheet of foil will then result in the application of successive layers of foil to the compartment, the successive layers being spaced apart by the corrugations.

Figures 1, 4:
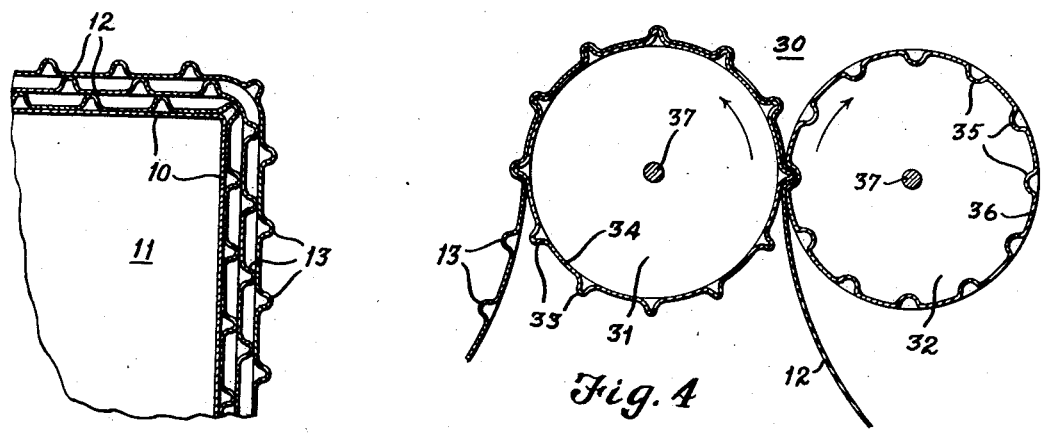
Fig. 4 is an enlarged sectional view taken on the line 4—4 of Fig. 2, showing a pair of corrugating rolls and having a strip of metal foil between the rolls.

Referring specifically to the drawings, 10 in Fig. 1 thereof represents a portion of the side walls of a square or rectangular compartment 11 to be insulated previous to being assembled in a refrigerator cabinet. These walls 10 have continuous layers of metal foil 12 wound therearound. The layers of foil 12 are spaced from one another by corrugations 13 formed in the strip of foil before being wound around the walls 10.

It is common knowledge that sheets or layers of metal foil having bright surfaces when spaced apart to provide air pockets therebetween afford efficient insulating walls for compartments to be refrigerated. Since it has previously been an expensive proposition to secure such insulation to the walls of compartments, I have devised an improved method of an apparatus for winding or applying the layers 12 of the metal foil to walls 10 of compartment 11 disclosed in Fig. 1 which I will hereinafter fully describe.

Figure 2:
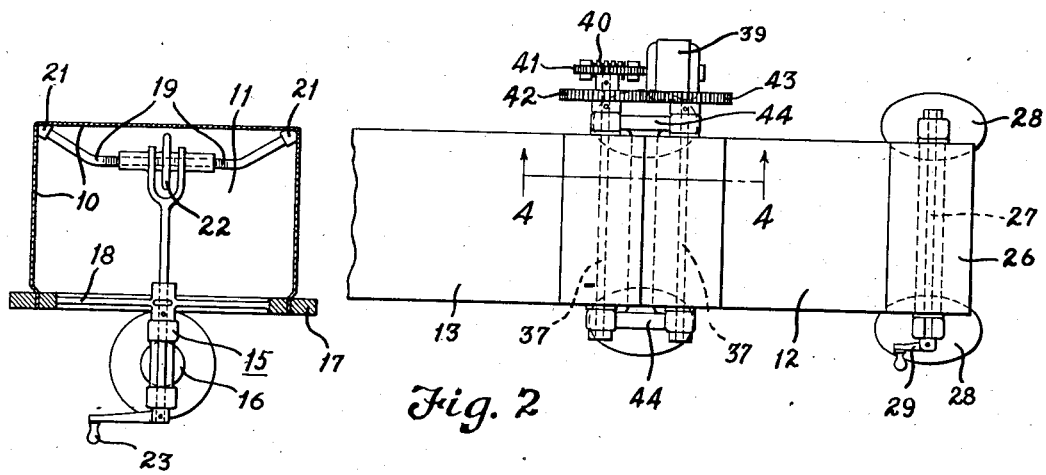
Figure 3:
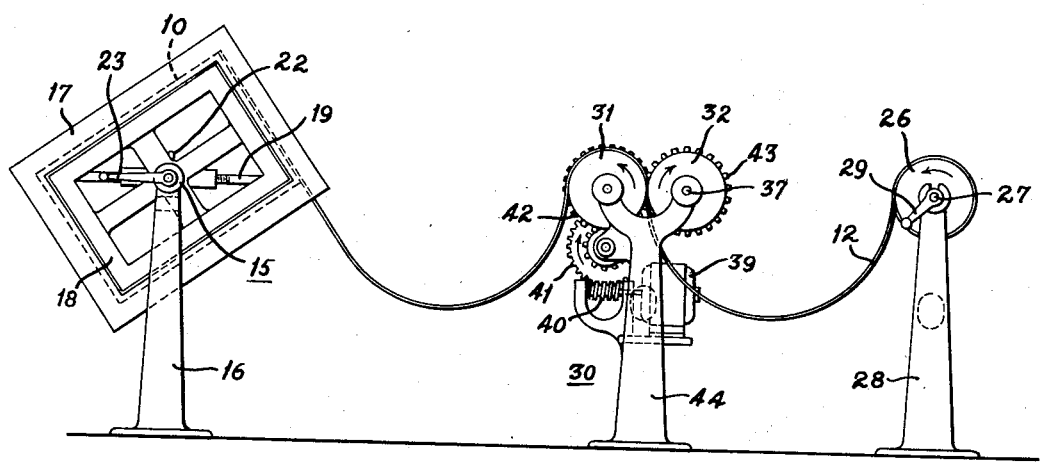

Referring now to Figs. 2 and 3, the compartment 11 formed by the walls 10 to be insulated is placed on a suitable rotating device 15 supported by the standard 16. The compartment 11 includes a frame 17 which serves as a door frame for the refrigerator cabinet after the cabinet is assembled therein. The rotating device 15 includes a member 18 which is of suitable form to snugly fit the interior of the walls 10 adjacent the door frame 17 secured to the compartment. Any suitable means of supporting the compartment 11 at the rear thereof when placed on the device 15 may be employed. For this purpose I have shown arms 19 having resilient pads 21 secured to the outer ends thereof, which pads are adapted to firmly grip the interior corners of the walls 10 at the rear of the compartment 11. These arms 19 may be moved into and out of engagement with the walls 10 by a hand wheel 22 having a threaded portion of suitable width to receive a portion of the inner threaded ends of the arms 19. The compartment 11, when mounted on the device 15, can be rotated either manually by the crank 23 or may, if desired, be rotated by any other suitable means.

The thin metal foil 12 to be corrugated and wound on or around the walls of the compartment 11 is contained in the form of a continuous strip on a removable roll 26 having a central shaft 27. The shaft 27 is mounted on a support or standard 28 and may be rotated by the crank 29. The metal foil 12 is run through an apparatus 30 previous to being wound on or around the walls of the compartment 11. The apparatus 30 includes two rolls or dies 31 and 32 between which the metal foil is passed (see Fig. 4). The roll or die 31 has protrusions 33 extending from its cylindrical surface 34. Roll or die 32 has depressions 35 formed in its cylindrical surface 36. Protrusions 33 of roll 31 are adapted to fit closely in the depressions 35 formed in roll 32. Metal foil 12 is fed into the apparatus 30 between the rolls 31 and 32 and obviously as the foil passes through the rolls, it will be corrugated by the protrusions 33 and depressions or grooves 35. The protrusions 33 and depressions 35 preferably extend the full width of the sheet of metal foil 12. However, such protrusions and depressions may be of any desired length and shaped to suit various requirements and the type of corrugations desired. The rolls or dies 31 and 32 are secured to the supporting shafts 37 and may be rotated in any suitable manner to cause the metal foil 12 to pass through the apparatus 30. For instance the rolls or dies 31 and 32 may be rotated by an electric motor 39 through the medium of a worm gear 40, driving gear 41, and gears 42 and 43. This driving connection for rotating the rolls 31 and 32 is conventional and needs no further explanation here. A standard 44 is provided for suitably supporting the various elements comprising the corrugating apparatus 30.

The operation of the apparatus just described for corrugating and winding a continuous strip of metal foil will now be explained. The compartment to be surrounded by metal foil insulation is mounted on the rotating device 15, as previously described, and the end of the metal foil from the source of supply or roll 26 is placed between rolls or dies 31 and 32 after these rolls have been started in operation. The motor 39 rotates the rolls or dies 31 and 32 at a constant speed and these rolls therefore keep drawing in the flat metal foil from the supply roll 26. Consequently the metal foil leaving the corrugating apparatus 30 is provided with the corrugations 13 and is wound around the walls 10 of compartment 11 by manually rotating the compartment 11 with the crank arm 23. Obviously the compartment 11 does not have to be rotated as fast as the rotation of the rolls 31 and 32, due to the large area of the walls 10 which receive the metal foil from the corrugating apparatus 30. That is, a relative movement must occur between the corrugated strip of foil and the compartment 11. The end of the corrugated foil is preferably started at one corner of the walls 10 but may be started at any desired point around the compartment 11. The end of the foil may be cemented or glued in any suitable manner to the wall at the point winding thereof is begun. It is thus apparent that operation of the apparatus 30 and rotation of the compartment 11 in order to wind the corrugated metal foil thereon, will produce layers of metal foil on the walls 11 to form an insulating wall structure such as that disclosed in Fig. 1. Due to the continuous winding or integral layers of metal foil on the walls of the compartment 11, it is also apparent that corrugations 13 of any adjacent layers of the foil will therefore be directly opposite each other and that all these corrugations therefore engage the flat surfaces of the layers 12 of the foil, thus spacing each layer from one another to provide air pockets therebetween. After the desired thickness of the insulating wall, formed by the thin metal foil, has been obtained the foil is then cut and its end on the compartment 11 is cemented or glued to the layer beneath the end. Wheel 22 of the rotating device 15 is then manipulated to draw the arms 19 inwardly in order that the insulated compartment can be removed from the device 15 and another compartment to be insulated placed thereon. Obviously the rear wall of the compartment 11 is not covered with metal foil by my apparatus and this wall may be insulated in any desired manner such as by placing a frame containing spaced layers of the metal foil against the rear wall.

Figure 5:
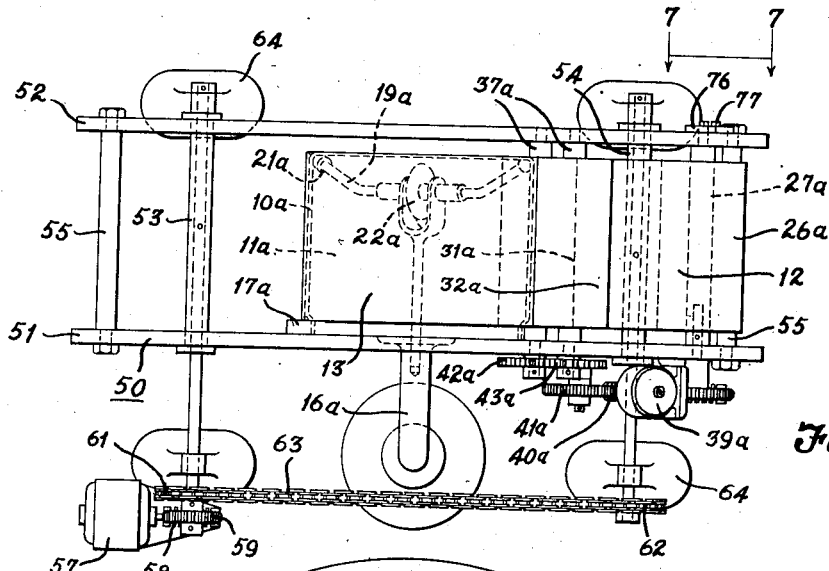
Fig. 5 is a plan view of a modified form of apparatus for corrugating and winding metal foil around the walls of the compartment to be insulated.
Figure 6:
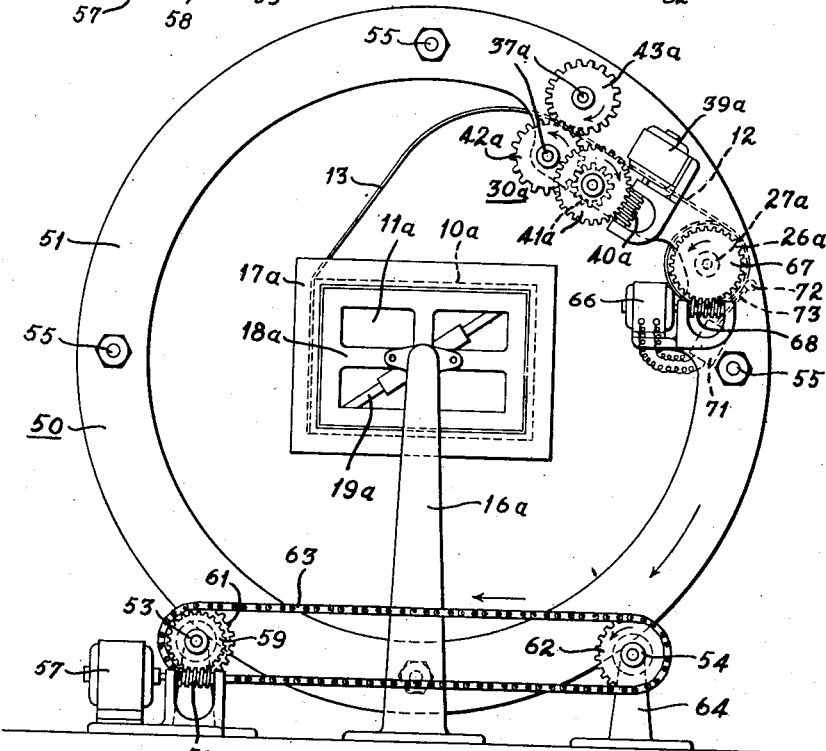
Fig. 6 is a front elevational view of the apparatus disclosed in Fig. 5.

In Figs. 5 and 6 I have shown a modified form of apparatus for winding the foil around the compartment according to my improved methods. In this form of apparatus the compartment 11a to be insulated is stationarily mounted on the standard 16a by a similar mounting or supporting means as that shown in Figs. 2 and 3, all of which means are designated in Figs. 5 and 6, with like reference characters having the suffix "a". the standard 16a extends into the central portion of a circular frame device 50 which includes two members 51 and 52 having outer circumferential edges resting upon rollers 53 and 54. The members 51 and 52 are secured together by rods or bolts 55 and are adapted to rotate with the frame device 50. The means for rotating the frame device 50 includes an electric motor 57 which drives rollers 53 and 54 through suitable driving connections with these rollers such for example as by worm gear 58, gear 59 and the gears 61 and 62 connected by an endless chain 63. The rollers 53 and 54 may be rotatively mounted in suitable supports or standards 64.

Upon one side of the frame device 50 is mounted the metal foil corrugating apparatus 30a which is also similar to the corrugating apparatus disclosed in Figs. 2 and 3 and has similar parts designated in Figs. 5 and 6 by like reference characters but having the suffix "a". The source of metal foil supply is contained on a roll 26a having a shaft 27a journalled in the members 51 and 52 of the frame device 50. Since it is impractical to manually unroll the metal foil from its supply roll in this modified form of apparatus, due to its being rotated or revolved, I have provided means for driving the supply rod to feed the metal foil into the corrugating apparatus. This means includes an electric motor 66 which drives the gear 67 secured to the metal frame supply roll shaft 27a through the worm gear 68. The electrical circuit to motors 39a and 66 mounted on the frame device 50 can be made in any suitable manner such as for example by conducting rings or the like mounted in the members 51 and 52 of device 50, which rings may contact with similar conducting rings in rollers 53 and 54. Brushes or rubbing blocks may be connected with the source of supply and may contact with the conducting rings in rollers 53 and 54. Such electric circuits form no part of my invention and are well-known to the art and therefore need not be herein shown or described in detail.

A controller 71 is inserted in the electric circuit to the motor 66 and may be of any conventional form. Controller 71 controls the amount of electric current passing through motor 66 for governing the speed of this motor and consequently the speed of rotation of metal foil supply roll 26a. A rubbing block or pad 72 may engage the metal foil or supply roll 26a and may be secured to a pivoted arm 73 having an electric contact secured to its end opposite the pad 72 for engaging one of a plurality of electric contacts in the controller 71 to governor the amount of electric current passing through the controller 71 to motor 66. Such controllers are well-known in their respective art and need not be herein fully described or shown in detail in the drawings. By the provision of means for controlling the speed of the metal foil supply roll 26a, it is apparent that as the foil supply diminishes on roll 26a, the speed of motor 66 will be increased so that the desired speed of roll 26a is maintained to properly feed metal foil to the corrugating apparatus 30a according to the constant speed of its rolls or dies 42a and 43a.

Figure 7:
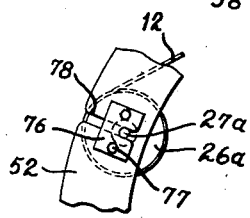
Fig. 7 is a view taken on the line 7—7 of Fig. 5 showing a clamp for securing a supply roll of metal foil to the corrugating and winding apparatus disclosed in Figs. 5 and 6.

In order to prevent the metal foil supply roll 26a from becoming detached from the members 51 and 52 of frame device 50 during rotation thereof, I have provided a means to lock the roll 26a thereon. This means includes a plate 76 secured to the member 52 (see Fig. 7) by bolts or screws 77. The shaft 27a of the supply roll 26a can be slipped through the slot 78 in member 52, when plate 76 is removed, to replace a supply roll of metal foil on the frame device 50.

The operation of the modified form of apparatus just described for corrugating and winding a continuous strip of metal foil will now be explained. The compartment to be surrounded by a metal foil insulation is stationarily mounted on the standard 16a. Motors 39a and 66 are operated to supply the corrugated metal foil to be applied to the walls 10a of compartment 11a. The end of the corrugated foil is cemented or glued to one wall 10a of the compartment 11a and motor 57 is then started to cause rotation of the frame device 50 around the compartment 11a. Obviously, as the frame device 50 revolves around walls of compartment 11a during operation of the corrugating apparatus mounted thereon, the metal foil will be wound or applied to the compartment walls. After the desired number of layers of metal foil or thickness of the insulating wall has been obtained, the entire apparatus is stopped and the foil cut and another compartment to be insulated is placed on the stationary standard 16a.

It is thus apparent from the foregoing that I have provided an improved apparatus for forming an insulating wall from a continuous strip of metal foil around an object or compartment to be insulated. My invention eliminates the necessity of manually handling the thin metal foil while forming an insulating wall. The time required to form an insulating wall of the type disclosed is also minimized by my improved method and apparatus and consequently the cost of forming such a wall is likewise reduced.

While the form of embodiment of the invention as herein disclosed, constitutes a preferred form, it is to be understood that other forms might be adopted, all coming within the scope of the claims which follow.

What is claimed is as follows:

1. An apparatus for insulating a compartment comprising in combination, means for corrugating a continuous strip of flat metal foil, means for operating said corrugating means at a predetermined speed, and means for causing movement of the compartment at a variable speed relative to the predetermined speed of said first named means to maintain said corrugated foil at a constant tension and to cause winding thereof around a plurality of walls of the compartment.

2. An apparatus for insulating a compartment comprising in combination, means for corrugating a continuous strip of flat metal foil, means for operating said corrugating means at a predetermined speed, and means for rotating the compartment at a variable speed relative to the predetermined speed of said first named means for winding the corrugated foil at a constant tension around a plurality of walls of the compartment.

3. An apparatus for insulating a compartment comprising in combination, means for corrugating a continuous strip of flat metal foil, means for operating said corrugating means at a predetermined speed, means for rotating said first named means and said second named means around a plurality of walls of the compartment to cause winding of the corrugated foil therearound, and means operable at a variable speed relative to the predetermined speed of said first named means for moving the flat metal foil toward said corrugating means while maintaining the flat metal foil between said last named means and said corrugating means at a constant tension.

4. An apparatus for insulating a compartment comprising in combination, means for corrugating a continuous strip of flat metal foil, a source of supply of said metal foil, means for operating said source of supply, means for rotating said first and second named means together with said source of supply around a plurality of walls of the compartment to cause winding of the corrugated foil therearound, means for operating said rotating means, and means for controlling the speed of operation of said source of metal foil supply with respect to the speed of operation of said corrugating means, said last named means being responsive to the amount of metal foil in or on said source of supply.

5. Means for insulating an object including means for feeding a continuous bright metal surfaced sheet, means for corrugating the continuous bright metal surfaced sheet, and means for relatively rotating the corrugating means with respect to the object to be insulated to wrap the continuous bright metal surfaced sheet spirally about the object a plurality of times to provide a plurality of bright metal surfaced layers spaced by air spaces surrounding the object.

6. Means for insulating an object including means for feeding a continuous bright metal surfaced sheet at a predetermined linear speed, means for corrugating the continuous sheet in proper relation to the feeding of the sheet, and means for relatively rotating the corrugating means with respect to the object to be insulated to wrap the continuous bright metal surfaced sheet spirally about the object a plurality of times to provide a plurality of bright metal surfaced layers spaced by air spaces surrounding the object.

7. Means for insulating an object including means for supporting the object to be insulated, means for feeding and corrugating a continuous bright metal surfaced sheet, and means for relatively revolving one of said means about the other to wrap the sheet spirally about the object to be insulated in layers spaced by the corrugations to provide air spaces between the layers of the sheet.

8. Means for insulating an object including means for supporting the object to be insulated, means for feeding and corrugating a continuous sheet, and means for relatively revolving one of said means about the other to wrap the sheet spirally about the object to be insulated to provide substantially dead air spaces surrounding the object.

EDWARD B. NEWILL.